United States Patent
Watanabe et al.

(10) Patent No.: US 10,459,424 B2
(45) Date of Patent: Oct. 29, 2019

(54) NUMERICAL CONTROLLER FOR CONTROLLING TAPPING

(71) Applicant: FANUC CORPORATION, Minamitsuru-gun, Yamanashi (JP)

(72) Inventors: Tooru Watanabe, Yamanashi (JP); Tooru Kubota, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 35 days.

(21) Appl. No.: 15/817,790

(22) Filed: Nov. 20, 2017

(65) Prior Publication Data

US 2018/0143612 A1 May 24, 2018

(30) Foreign Application Priority Data

Nov. 21, 2016 (JP) ................... 2016-226254

(51) Int. Cl.
   *G05B 19/402* (2006.01)
(52) U.S. Cl.
   CPC .. *G05B 19/402* (2013.01); *G05B 2219/31455* (2013.01)
(58) Field of Classification Search
   CPC ............... G05B 19/186; G05B 19/402; G05B 2219/31455; G05B 2219/45216
   See application file for complete search history.

(56) References Cited

U.S. PATENT DOCUMENTS

| | | | | |
|---|---|---|---|---|
| 4,509,126 A | * | 4/1985 | Olig | G05B 19/4163 318/561 |
| 4,778,313 A | * | 10/1988 | Lehmkuhl | B23B 29/03457 29/56.5 |
| 5,027,562 A | * | 7/1991 | Kobayashi | B24B 5/14 451/11 |
| 5,062,744 A | | 11/1991 | Nakamura et al. | |
| 5,132,912 A | * | 7/1992 | Ito | G05B 19/186 318/571 |
| 5,165,828 A | | 11/1992 | Green et al. | |

(Continued)

FOREIGN PATENT DOCUMENTS

| | | |
|---|---|---|
| CN | 1523734 A | 8/2004 |
| CN | 1892523 A | 1/2007 |

(Continued)

OTHER PUBLICATIONS

Notification of Reasons for Refusal for Japanese Application No. 2016-226254, dated Jun. 26, 2018 with translation, 6 pages.

(Continued)

*Primary Examiner* — M.N. Von Buhr
(74) *Attorney, Agent, or Firm* — RatnerPrestia

(57) ABSTRACT

Provided is a numerical controller capable of shortening cycle time while maintaining machining accuracy of a rigid tap. The numerical controller includes: a rigid tap control unit that executes a rigid tap by synchronizing rotational speed of a spindle with feedrate; a synchronization error monitoring unit that starts or terminates monitoring of a synchronization error between the rotational speed of the spindle and the feedrate at a point R set to a height equal to or higher than a top of a workpiece; and a workpiece top detection unit that detects a position of the workpiece top. The synchronization error monitoring unit starts monitoring the synchronization error at the position of the workpiece top instead of the point R.

2 Claims, 10 Drawing Sheets

DRILLING

RIGID TAP

(56) References Cited

U.S. PATENT DOCUMENTS

| | | | |
|---|---|---|---|
| 6,233,497 B1* | 5/2001 | Kachi | B24B 5/14 |
| | | | 451/9 |
| 7,656,106 B2 | 2/2010 | Iwashita et al. | |
| 8,692,488 B2* | 4/2014 | Takayama | G05B 19/416 |
| | | | 318/49 |
| 9,523,975 B2* | 12/2016 | Sonoda | G05B 1/01 |
| 9,753,449 B2* | 9/2017 | Sato | G05B 19/4063 |
| 2004/0145333 A1 | 7/2004 | Toyozawa et al. | |
| 2005/0241843 A1 | 11/2005 | Fujibayashi et al. | |
| 2007/0007926 A1 | 1/2007 | Iwashita et al. | |
| 2015/0286197 A1* | 10/2015 | Sonoda | G05B 1/01 |
| | | | 318/601 |
| 2016/0291580 A1 | 10/2016 | Morita et al. | |
| 2017/0361400 A1* | 12/2017 | Hagenlocher | B23K 37/0235 |

FOREIGN PATENT DOCUMENTS

| CN | 104615092 A | 5/2015 |
|---|---|---|
| CN | 104977895 A | 10/2015 |
| CN | 106020130 A | 10/2016 |
| JP | 01301017 A | 12/1989 |
| JP | 0241814 A | 2/1990 |
| JP | 02160454 A | 6/1990 |
| JP | 06304814 A | 11/1994 |
| JP | 2001277075 A | 10/2001 |
| JP | 3433967 B | 5/2003 |
| JP | 2005316747 A | 11/2005 |
| JP | 2007042068 A | 2/2007 |
| JP | 2014035629 A | 2/2014 |

OTHER PUBLICATIONS

Chinese Office Action with Search Report for Chinese Application No. 201711160358.0 dated Jun. 6, 2019, with translation, 20 pages.

* cited by examiner

NUMERICAL CONTROLLER FOR CONTROLLING TAPPING

CROSS-REFERENCE TO RELATED APPLICATIONS

This application is a new U.S. Patent Application that claims benefit of Japanese Application No. 2016-226254, filed Nov. 21, 2016, the disclosure of this application is being incorporated herein by reference in its entirety for all purposes.

BACKGROUND OF THE INVENTION

1. Field of the Invention

The present invention relates to a numerical controller, and more particularly to a numerical controller capable of shortening cycle time of a rigid tap.

2. Description of the Related Art

The rigid tap is a processing method in which threading is performed at a constant pitch by synchronizing rotational speed of a spindle with feedrate. For example, Japanese Patent No. 3433967 discloses an example of a rigid tap of the related art.

With reference to FIG. 1, the rigid tap of the related art will be described. A position at which the synchronization between the rotational speed of the spindle and the federate is started is referred to as a point R. The point R is set upward by a predetermined distance from a workpiece top. A numerical controller moves the spindle with rapid traverse up to a point R. Accordingly, it is possible to shorten the cycle time. From the point R, machining is performed at feedrate that can ensure synchronization accuracy.

This is because a certain degree of delay occurs from a command from the numerical controller to an actual operation of a spindle (movement in a Z direction and spindle rotation), and it is difficult to secure the synchronization accuracy if the feedrate is too fast.

The conventional numerical controller once stops the movement of a spindle at the point R. This is for securing of the subsequent synchronization accuracy by temporarily eliminating the delay of the operation with respect to the command generated so far. The numerical controller monitors the synchronization accuracy after the point R and determines as an error if an error amount exceeds a designated error amount.

Recently, there are an increasing number of cases where the spindle stop at the point R is not executed in order to shorten the cycle time. This is because, for example, there is a request for shortening of the cycle time and suppression of a shock caused by spindle stop, and the like. When the spindle stop at the point R is not executed, the following problems may occur.

First, a positional deviation amount of a drilling axis at the point R, that is, the delay of the operation of the spindle with respect to the command increases, and a synchronizing error of a rigid tap, that is, the synchronizing error between the spindle and the drilling axis also increases. Thus, the frequency of occurrence of errors increases if the synchronization accuracy after the point R is monitored similarly as in the related art. In order to suppress such a problem, it is necessary to set a threshold value of the error amount that needs to be determined as the error in the synchronization accuracy monitoring process to be large when the spindle stop at the point R is not executed. As a result, there is a possibility that the machining accuracy may become worse than that in the case of executing the spindle stop at the point R. That is, if the error caused by not executing the spindle stop at the point R is overlooked, there occurs a disadvantage of missing an error which should not be overlooked.

If the numerical controller grasps a position of a top of a workpiece, there is a possibility that it is possible to maintain the machining accuracy by performing strict synchronization accuracy monitoring from the workpiece top at the latest in the case of not executing the spindle stop at the point R. However, such a method has not been proposed to date.

Alternatively, if a distance between the point R and the workpiece top is increased, it is possible to absorb the positional deviation amount of the drilling axis while a tool is moved from the point R to the workpiece top, and thus, there is a possibility that the machining accuracy of the tap can be maintained to some extent without stopping the spindle at the point R. However, there is a problem that the cycle time increases if the distance between the point R and the workpiece top is increased.

This problem will be further described with reference to FIG. 2. The upper view illustrates a temporal change of spindle speed in a hole drilling direction and the positional deviation amount when the distance between the point R and the workpiece top is short. In this case, the cycle time can be shortened, but the error amount at the start of cutting increases. On the other hand, the lower view illustrates a temporal change of the spindle speed in the hole drilling direction and the positional deviation amount when the distance between the point R and the workpiece top is long. In this case, the error amount at the start of cutting can be reduced, but the cycle time is extended.

SUMMARY OF THE INVENTION

The present invention has been made in view of the above-described problems, and an object thereof is to provide a numerical controller capable of shortening cycle time while maintaining machining accuracy of a rigid tap.

A numerical controller according to an embodiment of the present invention includes: a rigid tap control unit that executes a rigid tap by synchronizing rotational speed of a spindle with feedrate; a synchronization error monitoring unit that starts or terminates monitoring of a synchronization error between the rotational speed of the spindle and the feedrate at a point R set to a height equal to or higher than a top of a workpiece; and a workpiece top detection unit that detects a position of the workpiece top. In the numerical controller, the synchronization error monitoring unit starts monitoring of the synchronization error at the position of the workpiece top instead of the point R.

A numerical controller according to another embodiment includes: a rigid tap control unit that executes a rigid tap by synchronizing rotational speed of a spindle with feedrate; a synchronization error monitoring unit that starts or terminates monitoring of a synchronization error between the rotational speed of the spindle and the feedrate at a point R set to a height equal to or higher than a top of a workpiece; a workpiece top detection unit that detects a position of the workpiece top; and a machine learning unit with learning such that the point R at which cycle time and the synchronization error on the workpiece top satisfy predetermined conditions is output for state data when at least the position of the workpiece top is input as the state data. In the numerical controller, the synchronization error monitoring unit starts monitoring of the synchronization error at the point R output by the machine learning unit.

A numerical controller according to another embodiment includes: a rigid tap control unit that executes a rigid tap by synchronizing rotational speed of a spindle with feedrate; a synchronization error monitoring unit that starts or terminates monitoring of a synchronization error between the rotational speed of the spindle and the feedrate at a point R set to a height equal to or higher than a top of a workpiece; and a workpiece top detection unit that detects a position of the workpiece top. In the numerical controller, the synchronization error monitoring unit terminate monitoring of the synchronization error at the position of the workpiece top instead of the point R.

According to the present invention, it is possible to provide the numerical controller capable of shortening the cycle time while maintaining the machining accuracy of the rigid tap.

BRIEF DESCRIPTION OF THE DRAWINGS

The above-described and other objects and characteristics of the present invention are made apparent in the following description of an embodiment with reference to the appended drawings. Among these drawings.

DETAILED DESCRIPTION OF THE PREFERRED EMBODIMENTS

Hereinafter, embodiments of the present invention will be described with reference to the drawings.

First Embodiment

A numerical controller 100 according to a first embodiment is characterized by starting synchronization error monitoring from a workpiece top instead of the point R.

Figure 7:
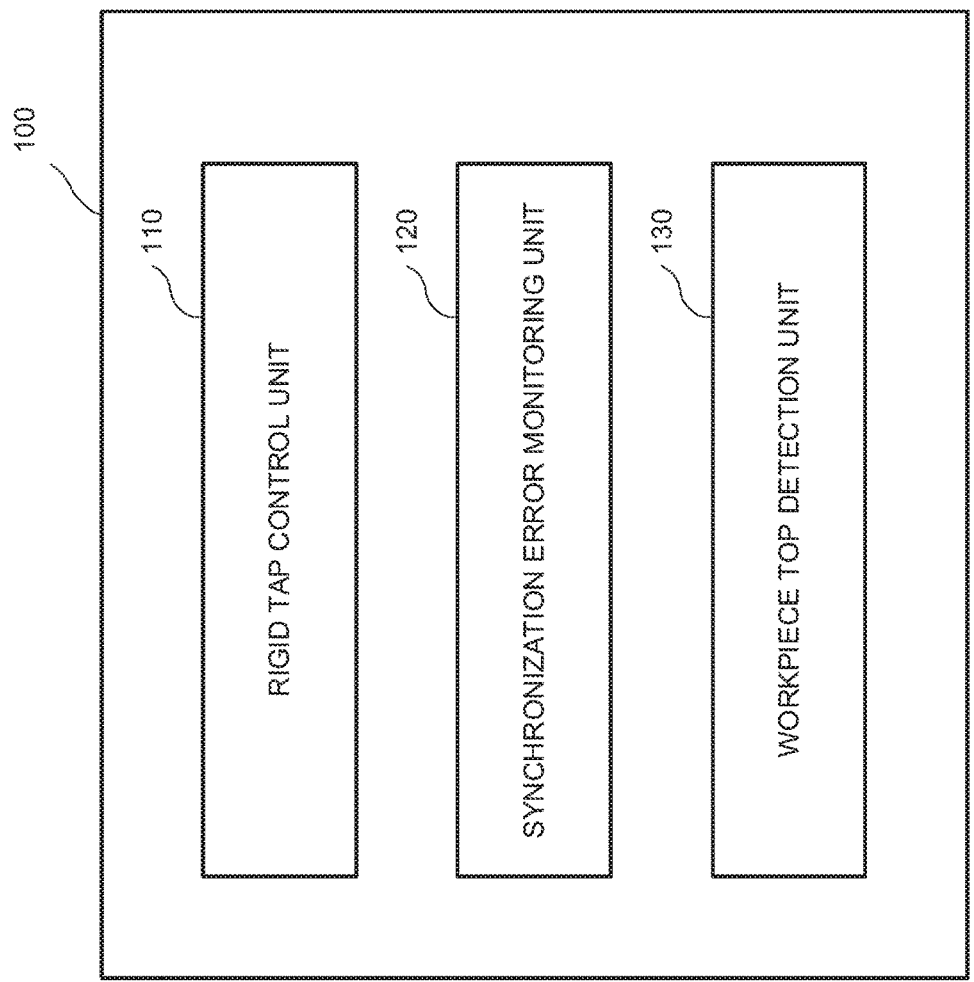
FIG. 7 is a block diagram illustrating a configuration of the numerical controller according to the first embodiment.

FIG. 7 is a block diagram illustrating a configuration of the numerical controller 100 according to the first embodiment of the present invention. The numerical controller 100 includes a rigid tap control unit 110, a synchronization error monitoring unit 120, and a workpiece top detection unit 130.

The numerical controller 100 is typically an information processing apparatus that includes a central processing unit (CPU), a storage device, and an input/output device, and logically implement the rigid tap control unit 110, the synchronization error monitoring unit 120, and the workpiece top detection unit 130 by causing the CPU to execute a predetermined program.

The rigid tap control unit 110 controls a spindle to execute a rigid tap. The synchronization error monitoring unit 120 monitors a synchronization error at the time of performing machining ahead of the workpiece top and outputs an error when an error amount exceeds a predetermined threshold value. Prior to the execution of the rigid tap using the rigid tap control unit 110, the workpiece top detection unit 130 detects a position of the top of the workpiece and stores the detected position.

Figure 3:
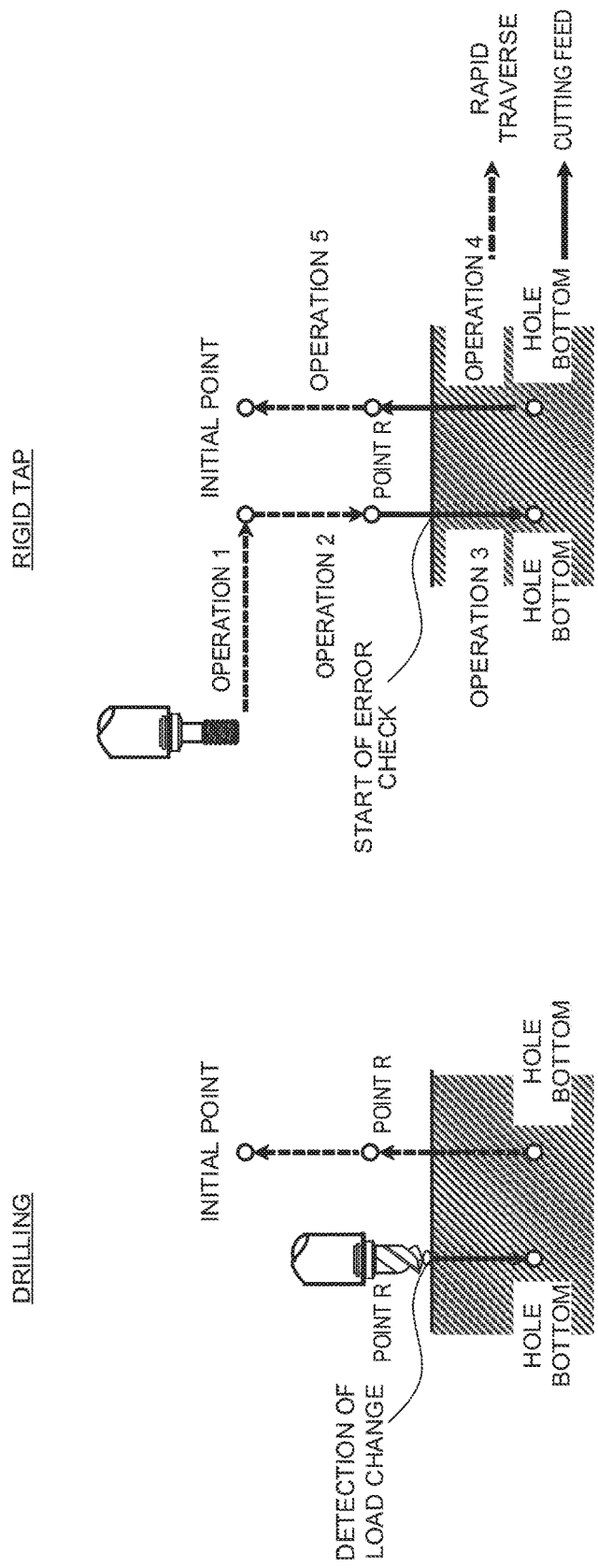
FIG. 3 is a view for describing a rigid tap using a numerical controller according to a first embodiment.

Next, a typical operation of the numerical controller 100 according to the first embodiment will be described. In general, a process of opening a pilot hole in a workpiece is executed before execution of the rigid tap. During the execution of the process of opening the pilot hole in the workpiece, the workpiece top detection unit 130 monitors a load torque of the spindle and stores a distal end position of a tool at the time when the load exceeds a threshold value (the left drawing of FIG. 3). This position is presumed to be the workpiece top.

Subsequently, the rigid tap control unit 110 executes the rigid tap. Here, the rigid tap control unit 110 does not execute spindle stop at the point R. In addition, the synchronization error monitoring unit 120 does not perform synchronization error monitoring after the point R, either.

The synchronization error monitoring unit 120 constantly monitors the distal end position of the tool and compares the position with the workpiece top position stored by the workpiece top detection unit 130. When the distal end position of the tool reaches the workpiece top, the synchronization error monitoring unit 120 starts a process of monitoring the synchronization error (the right drawing of FIG. 3).

More specifically, the synchronization error monitoring unit 120 calculates the synchronization error by the following calculation formula.

Synchronization Error=(Plus-Side Maximum Value of Difference of Spindle-Converted Positional deviation)−(Minus-Side Maximum Value of Difference of Spindle-Converted Positional deviation)

Difference of Spindle-Converted Positional deviation=(Spindle positional deviation Amount/Gear Ratio)−(Drilling axis positional deviation Amount×Number of Pulses Per Spindle Rotation)/Lead of Screw Here, the gear ratio is a gear ratio between a spindle motor and the spindle and is typically 1:1.

The spindle positional deviation amount is the number of pulses indicating an angle of an actual spindle delay relative to an angle command from the numerical controller. The drilling axis positional deviation amount is the number of pulses indicating the amount of an actual axis delay relative to the command from the numerical controller.

In the present embodiment, it is possible to set the threshold value of the error amount that needs to be determined as an error to be smaller than that of the case where the synchronization error monitoring is started from the point R. This is because the amount of positional deviation of the drilling axis is generally absorbed until reaching the workpiece top from the point R, and the synchronization error also becomes small. Thus, there is no need to adopt an unnecessarily large threshold value, and it is possible to detect an error that should not be originally overlooked by setting an appropriate threshold value.

According to the present embodiment, the numerical controller 100 executes the synchronization error monitoring from the workpiece top instead of the point R. As a result, it is possible to maintain the machining accuracy while preventing deterioration in cycle time caused by stopping the spindle at the point R.

Second Embodiment

A numerical controller 100 according to a second embodiment is characterized by including a mechanism to automatically adjust a position of a point R.

Figure 8:
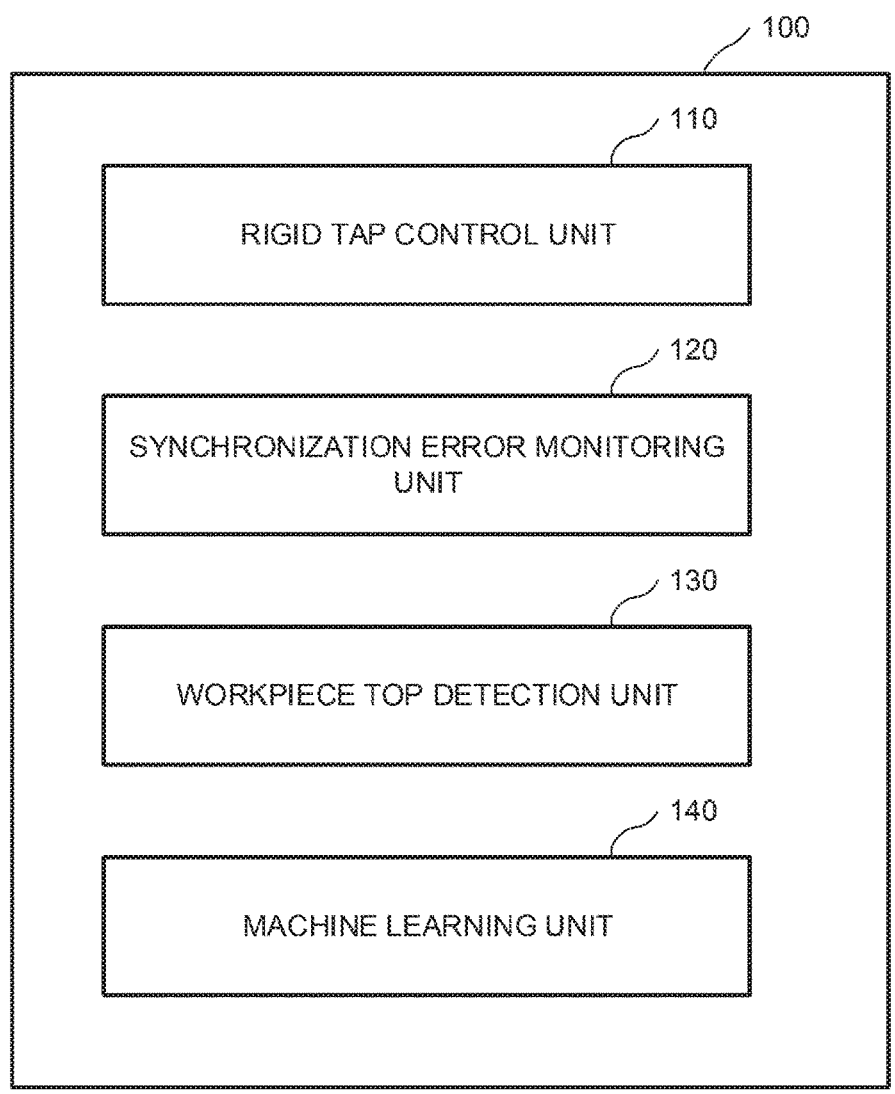
FIG. 8 is a block diagram illustrating a configuration of the numerical controller according to the second embodiment.

FIG. 8 is a block diagram illustrating a configuration of the numerical controller 100 according to the second embodiment of the present invention. The numerical controller 100 includes a rigid tap control unit 110, a synchronization error monitoring unit 120, a workpiece top detection unit 130, and a machine learning unit 140. The numerical controller 100 is typically an information processing apparatus that includes a central processing unit (CPU), a storage device, and an input/output device, and logically implement the rigid tap control unit 110, the synchronization error monitoring unit 120, the workpiece top detection unit 130, and the machine learning unit 140 by causing the CPU to execute a predetermined program.

The rigid tap control unit 110 controls a spindle to execute a rigid tap. The synchronization error monitoring unit 120 monitors a synchronization error at the time of performing machining a portion ahead of the point R and outputs an error when an error amount exceeds a predetermined threshold value. Prior to the execution of the rigid tap using the rigid tap control unit 110, the workpiece top detection unit 130 detects a position of a top of a workpiece and stores the detected position. The machine learning unit 140 is a machine learner that has learned in advance so as to output a position of the point R at which optimum cycle time and synchronization error on the workpiece top can be obtained under a certain condition.

Figure 4:
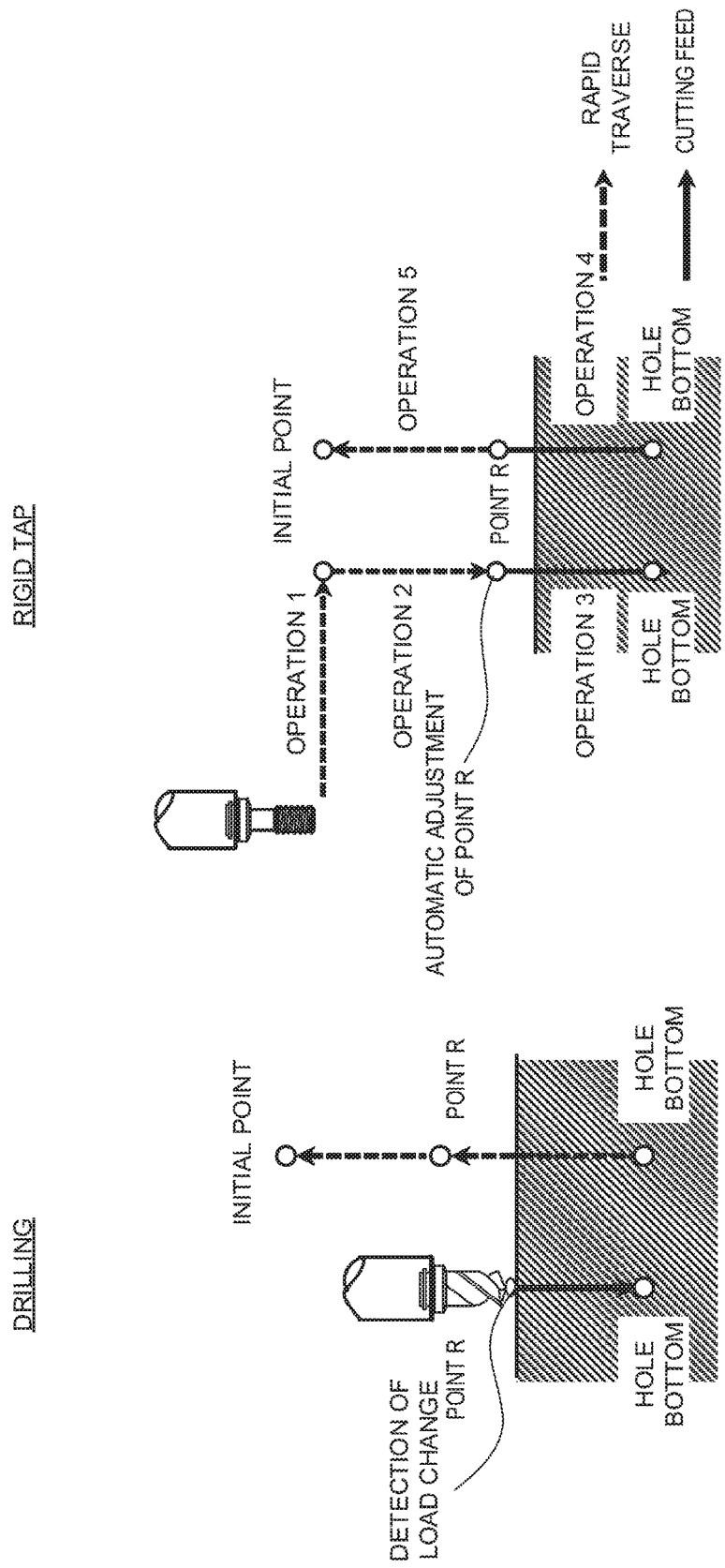
FIG. 4 is a view for describing a rigid tap using a numerical controller according to a second embodiment.

Next, a typical operation of the numerical controller 100 according to the first embodiment will be described. First, the workpiece top detection unit 130 detects and stores the position of the top of the workpiece similarly to the first embodiment (the left drawing in FIG. 4). Subsequently, the machine learning unit 140 inputs state data, such as feedrate of the spindle and rotational speed of the spindle, starting from the above-described workpiece top position, and outputs the position of the point R at which it is possible to optimize the cycle time and the synchronization error on the workpiece top (the right drawing in FIG. 4).

Next, the rigid tap control unit 110 executes the rigid tap. The rigid tap control unit 110 does not execute spindle stop at the point R. The synchronization error monitoring unit 120 starts a synchronization error monitoring process at the point R. In this manner, it is possible to shorten the cycle time and maintain the machining accuracy using the point R optimized by machine learning in the present embodiment.

Here, a configuration of the machine learning unit 140 will be described. The machine learning unit 140 is the machine learner for obtaining the optimum point R in the rigid tap. The machine learning unit 140 is configured such that the spindle feedrate, the spindle rotational speed, the workpiece top position, and the like are set as data relating to a machining state (hereinafter, referred to as state data),
and it is possible to derive the optimum point R according to the state data by performing machine learning on the cycle time and the synchronization error on the workpiece top of the case where the point R is changed on the premise of these pieces of state data.

Hereinafter, the machine learning introduced in the present embodiment will be briefly described.

1. Machine Learning

The machine learning is implemented by extracting useful rules, knowledge expressions, determination criteria, and the like, by analysis, from a set of data input to a device that performs the machine learning (hereinafter, referred to as the machine learner), outputting a determination result, and learning the knowledge. Although there are various machine learning techniques, but the machine learning may be roughly classified into "supervised learning", "unsupervised learning", and "reinforcement learning". Further, there is a technique called "deep learning" to learn extraction of feature data itself upon implementing these techniques.

The "supervised learning" can learn features of data sets by giving a large number of sets of data of certain input and a result (label) thereof to the machine learner, and recursively acquire a model to estimate the result from the input, that is, the relationship therebetween. This can be implemented using an algorithm such as a neural network to be described later.

The "unsupervised learning" is a technique of learning a device which leans any distribution of input data by giving a large amount of only input data to the machine learner and learning a device and performs compression, classification, shaping, and the like on the input data without giving corresponding teacher output data. It is possible to cause similar features of those data sets to cluster. It is possible to implement output prediction by providing a certain criterion and assigning an output to optimizes the clustering using a result of the clustering. In addition, there is also machine learning called "semi-supervised learning" as intermediate problem setting between the "unsupervised learning" and the "supervised learning", and this corresponds to a case where there are some data sets of input and output and the others are data with only input. In the present embodiment, it is possible to utilize data that can be acquired without actually operating the machining device by the unsupervised learning and to efficiently perform the learning.

The "reinforcement learning" is a method of learning an appropriate behavior based on the interaction between the behavior and the environment, that is, learning to maximize a reward obtained in the future by learning the behavior in addition to the determination and classification. In the reinforcement learning, learning can be started from a state where the machine learner does not know a result caused by the behavior at all or from a state where the machine learner only knows the result incompletely. In addition, learning can be also started from a good starting point using a state with preliminary learning (techniques such as the above-described supervised learning and reverse reinforcement learning) to mimic a behavior of human as an initial state.

Incidentally, when the machine learning is applied to a machining device, it is necessary to consider that it is possible to obtain a result of actual operation of the machining device for the first time, that is, it is necessary to search an optimal behavior by trial and error. Thus, a reinforcement learning algorithm in which the machine learner automatically learns the behavior to reach a target by granting the reward is adopted as the main learning algorithm of the machine learner in the present embodiment.

Figure 9:
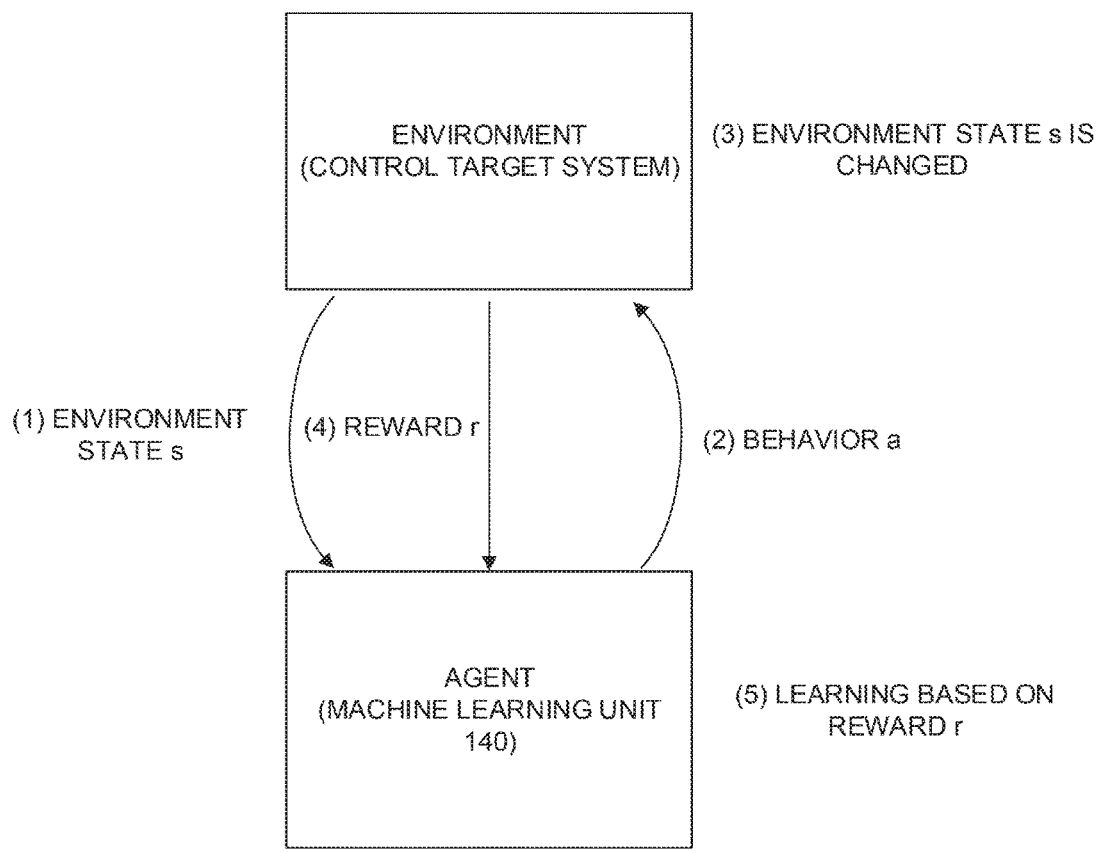
FIG. 9 is a view for describing a basic concept of a reinforcement learning algorithm.

FIG. 9 is a view for describing a basic concept of a reinforcement learning algorithm; In the reinforcement learning, the learning and behavior of an agent are advanced by interaction between the agent (the machine learner) as a subject of learning and the environment as a control target (a control target system). More specifically, the following interaction is performed between the agent and the environment: (1) the agent observes an environment state $s_t$ at a certain point in time; (2) the agent selects a behavior $a_t$ that can be taken by itself based on a result of the observation and past learning and executes the behavior $a_t$; (3) the environment state $s_t$ is changed to a next state $s_{t+1}$ based on the execution of some rules and the behavior $a_t$; (4) the agent receives a reward $r_{t+1}$ based on the state change as a result of the behavior $a_t$; and (5) the agent advances the learning based on the state $s_t$, the behavior $a_t$, the reward $r_{t+1}$, and the past learning result.

In the early stage of the reinforcement learning, the agent does not know any criteria of value determination, configured to select the optimal behavior $a_t$ for the environmental state $s_t$ in the behavior selection (2), at all. Thus, the agent selects various behaviors $a_t$ under a certain state $s_t$, and keeps learning the selection of a better behavior, that is, the criteria of the correct value determination based on the reward $r_{t+1}$ granted to the behavior $a_t$ at that time.

In the learning in (5) described above, the agent acquires mapping of the observed state $s_t$, behavior $a_t$, and reward $r_{t+1}$ as information that serves as the criteria to determine the amount of rewards that can be acquired in the future. For example, when the number of state that can be taken at each time is m and the number of behaviors that can be taken is n, a two-dimensional array of m×n that stores the reward $r_{t+1}$ for the set of the state $s_t$ and the behavior $a_t$ is obtained by repeating the behavior.

Then, the optimum behavior with respect to the state is kept learning by updating a value function (evaluation function) while repeating the behavior using the value function (evaluation function) which is a function indicating how good the state or behavior selected based on the obtained mapping is.

A state value function $V(s_t)$ is a value function indicating how good a certain state $s_t$ is. The state value function $V(s_t)$ is expressed as a function in which the state is an argument, and is updated based on a reward obtained for a behavior in a certain state, a value of a future state to be shifted by the behavior, and the like in the learning during repeating the behaviors. An update formula of the state value function $V(s_t)$ is defined according to the reinforcement learning algorithm, and for example, the state value function $V(s_t)$ is updated by the following Formula 1 in TD learning which is one of the reinforcement learning algorithms. In Formula 1, α and γ are called a learning coefficient and a discount rate, respectively, and defined within a range of 0<α≤1 and 0<γ≤1.

$$V(s_t) \leftarrow V(s_t) + \alpha[r_{t+1} + \gamma V(s_{t+1}) - V(s_t)]$$ [Formula 1]

In addition, a behavior value function $Q(s_t, a_t)$ is a value function indicating how good a behavior $a_t$ is in a certain state $s_t$. The behavior value function $Q(s_t, a_t)$ is expressed as a function in which the state and behavior are arguments and is updated based on a reward obtained for a behavior in a certain state, a value of a behavior in a future state to be shifted by the behavior, and the like in the learning during repeating the behaviors. An update formula of the behavior value function $Q(s_t, a_t)$ is defined according to the reinforcement learning algorithm, and for example, the behavior value function $Q(s_t, a_t)$ is updated by the following Formula 2 in Q learning which is one of the representative reinforcement learning algorithms. In Formula 2, α and γ are called a learning coefficient and a discount rate, respectively, and defined within a range of 0<α≤1 and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right)$$ [Formula 2]

This formula expresses a method of updating an evaluation value $Q(s_t, a_t)$ of the behavior $a_t$ at the state $s_t$ based on the reward $r_{t+1}$ returned as a result of the behavior $a_t$. This formula represents that $Q(s_t, a_t)$ is increased if an evaluation value $Q(s_{t+1}, \max(a))$ of a best behavior $\max(a)$ in the next state caused by the reward $r_{t+1}$+the behavior $a_t$ is greater than the evaluation value $Q(s_t, a_t)$ of the behavior $a_t$ in the state $s_t$, and $Q(s_t, a_t)$ is decreased in the opposite case. That is, a value of a behavior in a certain state is made to approach a reward that is immediately returned as a result and a value of the best behavior in the next state caused by the behavior.

In the Q learning, such update is repeated to finally make $Q(s_t, a_t)$ be an expectation value $E[\Sigma \gamma^t r_t]$ (the expectation value is obtained by changing the state according to the optimal behavior, and it is a matter of course that the expectation value is not known, and thus, needs to be learned while being searched).

Then, a behavior $a_t$ at which rewards $(r_{t+1}+r_{t+2}+\ldots)$ over the future becomes maximum is used in a current state $s_t$ using a value function (evaluation function) created by past learning (a behavior for shift to a state with the highest value in the case of using the state value function $V(s_t)$, and a behavior with the highest value in the state in the case of using the behavior value function $Q(s_t, a_t)$) in the selection of the behavior in (2) described above. Incidentally, there is also a method of selecting an arbitrary behavior with a certain probability in the selection of the behavior in (2) aiming at the progress of learning during the learning of the agent (ε greedy method).

Incidentally, there are a method of holding values for all state and behavior pairs (s, a) as a table (behavior value table) and a method of preparing a function approximating the above-described value function as a method of storing the value function (evaluation function) as the learning result. In the latter method, the above-described update formula can be implemented by adjusting a parameter of an approximation function using a method such as a stochastic gradient descent method. A supervised learning device such as a neural network can be used as the approximation function.

Figure 2:
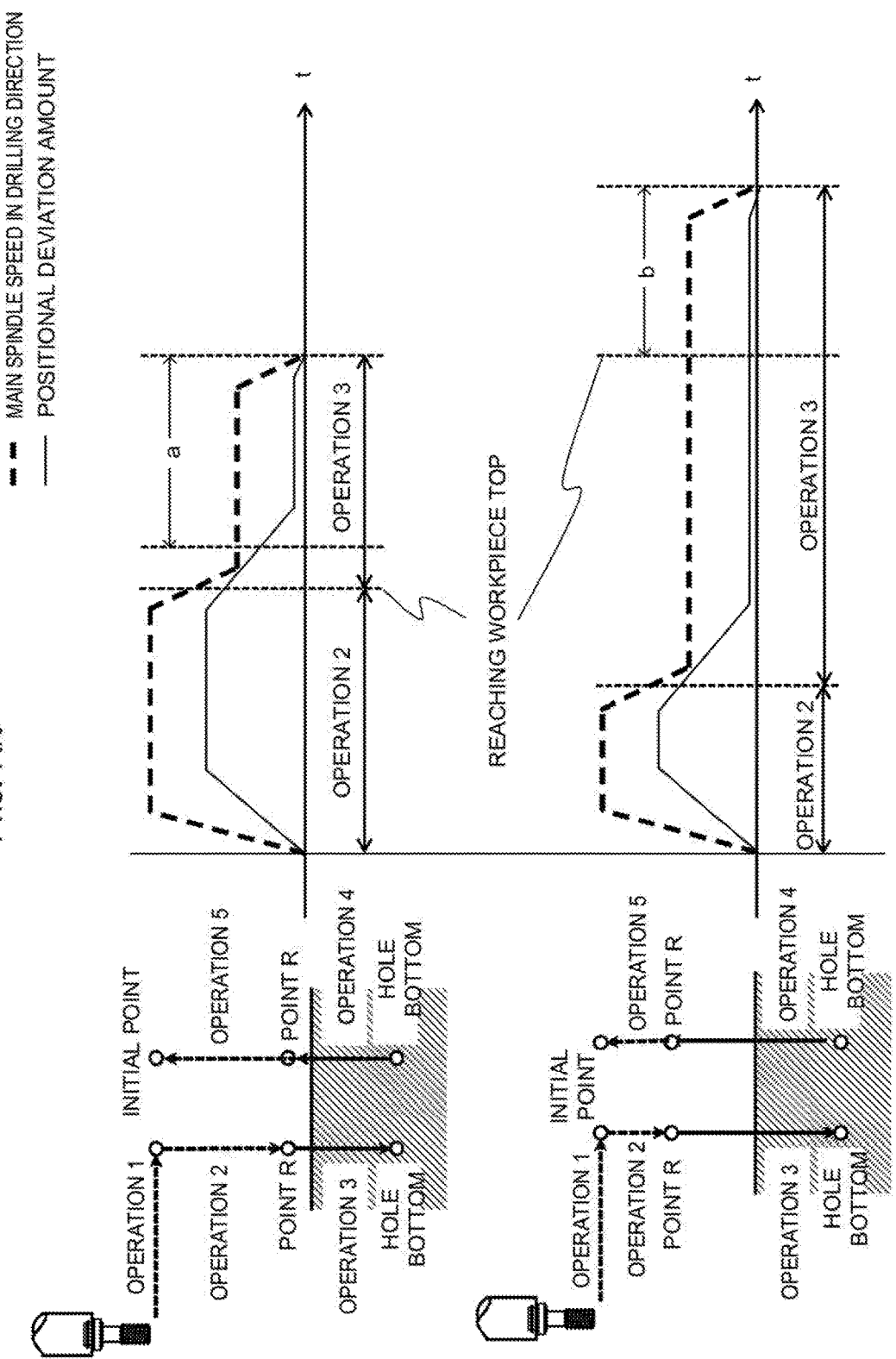
FIG. 2 is a view for describing a problem of the rigid tap of the related art.
Figure 10:
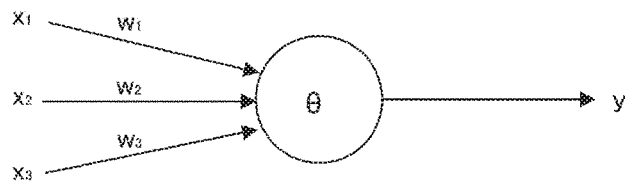
FIG. 10 is a schematic view illustrating a model of a neuron.

The neural network is composed of an arithmetic unit, a memory, and the like to implement a neural network imitating a model of a neuron as illustrated in FIG. 10, for example. FIG. 2 is a schematic view illustrating the model of the neuron.

As illustrated in FIG. 10, the neuron outputs an output y with respect to a plurality of inputs x (herein, inputs $x_1$ to $x_3$ as an example). Each of the inputs $x_1$ to $x_3$ is multiplied by a weight w ($w_1$ to $w_3$) corresponding to this input x. As a result, the neuron outputs the output y expressed by the following Formula 3. In Formula 3, the input x, the output y, and the weight w are all vectors. In addition, θ is a bias, and $f_k$ is an activation function.

$$y = f_k(\Sigma_{i=1}^n x_i w_i - \theta)$$ [Formula 3]

Figure 11:
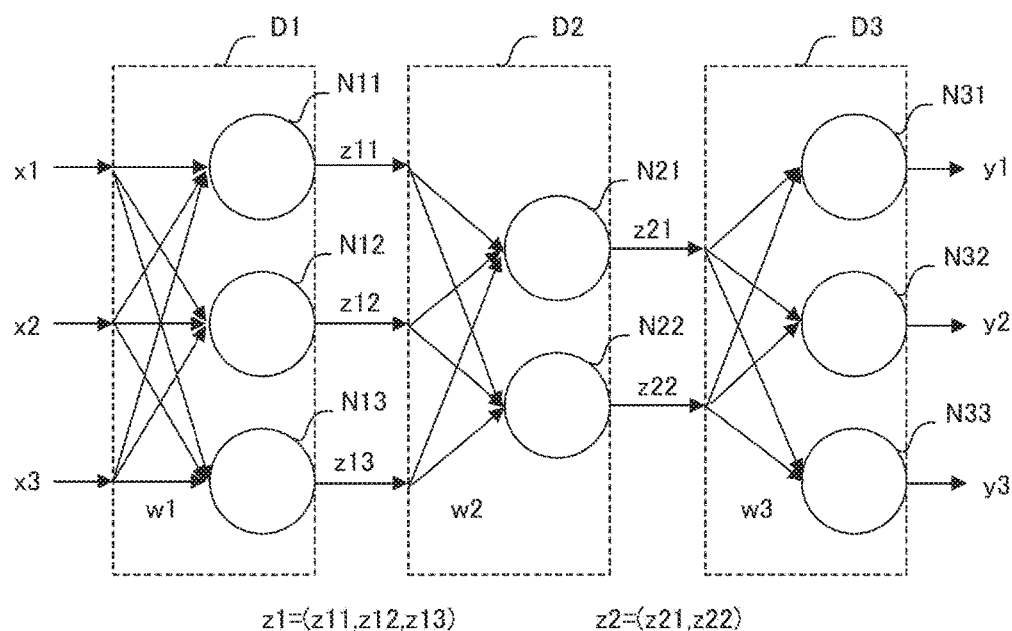
FIG. 11 is a schematic view illustrating a neural network having three layers of weighting.

Next, a neural network having three layers of weighting combined with the above-described neuron will be described with reference to FIG. 11. FIG. 11 is a schematic view illustrating the neural network having weighting of three layers D1 to D3. As illustrated in FIG. 11, the plurality of inputs x (herein, the inputs x1 to x3 as an example) are input from the left side of the neural network, and results y (herein, results y1 to y3 as an example) are output from the right side.

Specifically, the inputs x1 to x3 are input after being multiplied by weights corresponding to three neurons N11 to N13, respectively. The weights multiplied to these inputs are collectively referred to as w1. The neurons N11 to N13 output z11 to z13, respectively.

These z11 to z13 are collectively referred to as a feature vector z1 and can be regarded as a vector obtained by extracting the feature data of the input vector. This feature vector z1 is a feature vector between the weight w1 and the weight w2.

Here, z11 to z13 are input after being multiplied by the weights corresponding to two neurons N21 and N22, respectively. The weights multiplied to these feature vectors are collectively referred to as w2. The neurons N21 and N22 output z21 and z22, respectively. These are collectively referred to as a feature vector z2. This feature vector z2 is a feature vector between the weight w2 and the weight w3.

The feature vectors z21 and z22 are input after being multiplied by weights corresponding to three neurons N31 to N33, respectively. The weights multiplied to these feature vectors are collectively referred to as w3.

Finally, the neurons N31 to N33 output the results y1 to y3, respectively.

The operation of the neural network includes a learning mode and a value prediction mode, the weight w is learned using the learning data set in the learning mode, and the behavior determination of the machining device is performed in the prediction mode using a parameter thereof (although written as the prediction for the sake of convenience, various tasks such as detection, classification, inference, and the like are possible).

It is also possible to instantly learn data obtained by actually moving the machining device in the prediction mode and reflect the learned data in the next behavior (online learning) and to perform collective learning using a data group that has been collected in advance, and thereafter, perform the detection mode using a parameter thereof all the time (batch learning). It is also possible to perform intermediate learning to sandwich the learning mode each time data accumulates to some extent.

The weights w1 to w3 can be learned by an error back propagation method (back propagation). The error information is input from the right side and flows to the left side. The error back propagation method is a technique of adjusting (learning) each weight for each neuron so as to reduce a difference between an output y when the input x is input and an actual output y (teacher).

It is possible to add more layers to more than three layers in the neural network (which is called deep learning). It is possible to automatically acquire an arithmetic device, which gradually performs extraction of features of inputs and returns the result, from only teacher data.

When such a neural network is used as the approximation function, it is possible to advance the learning by storing the above-described value function (evaluation function) as the neural network while repeating (1) to (5) in the course of the reinforcement learning process described above.

Even when learning is completed in certain environment and is placed under new environment, it is possible to advance the learning to adapt to the new environment by performing additional learning. Accordingly, it is possible to perform learning of adjustment of a position and a length of each welding section in a short period of time by performing additional learning under a new machining precondition to learning of adjustment of a position of a length of each welding section in the past even in the case of applying the learning to the new machining precondition (a shape of a workpiece to be machined, a workpiece thickness, density of a workpiece material, a minimum distance of the welding section, proof stress per welding unit length, a force at the time of dropping the core, and the like) by applying the learning to the adjustment of the position and the length of each welding section of the core in a simulation device of a wire electric discharge machine as in the present invention.

In addition, when a plurality of agents are set to be connected to each other via a network or the like as a system, and information such as the state s, the behavior a, the reward r, and the like is shared among the agents to use the information for each learning, it is possible to efficiently perform the learning by performing the distributed reinforcement learning in which each agent performs learning even considering the environment of the other agents. Even in the present invention, it is possible to efficiently perform the learning of the adjustment of the position and the length of each welding section of the core in the simulation device of the wire electric discharge machine by performing the distributed machine learning in the state where the plurality of agents (machine learning devices), incorporated in a plurality of environment (simulation devices of wire electric discharge machines), are connected to each other via the network or the like.

Various techniques such as Q learning, a SARSA method, TD learning, and an AC method are well known as the reinforcement learning algorithm, any reinforcement learning algorithm may be adopted as the method to be applied to the present invention. Since the respective reinforcement learning algorithms described above are well known, a detailed description of each algorithm is omitted in this specification.

Next, an embodiment of the machine learning unit 140 will be described.

2. Embodiment

Figure 5:
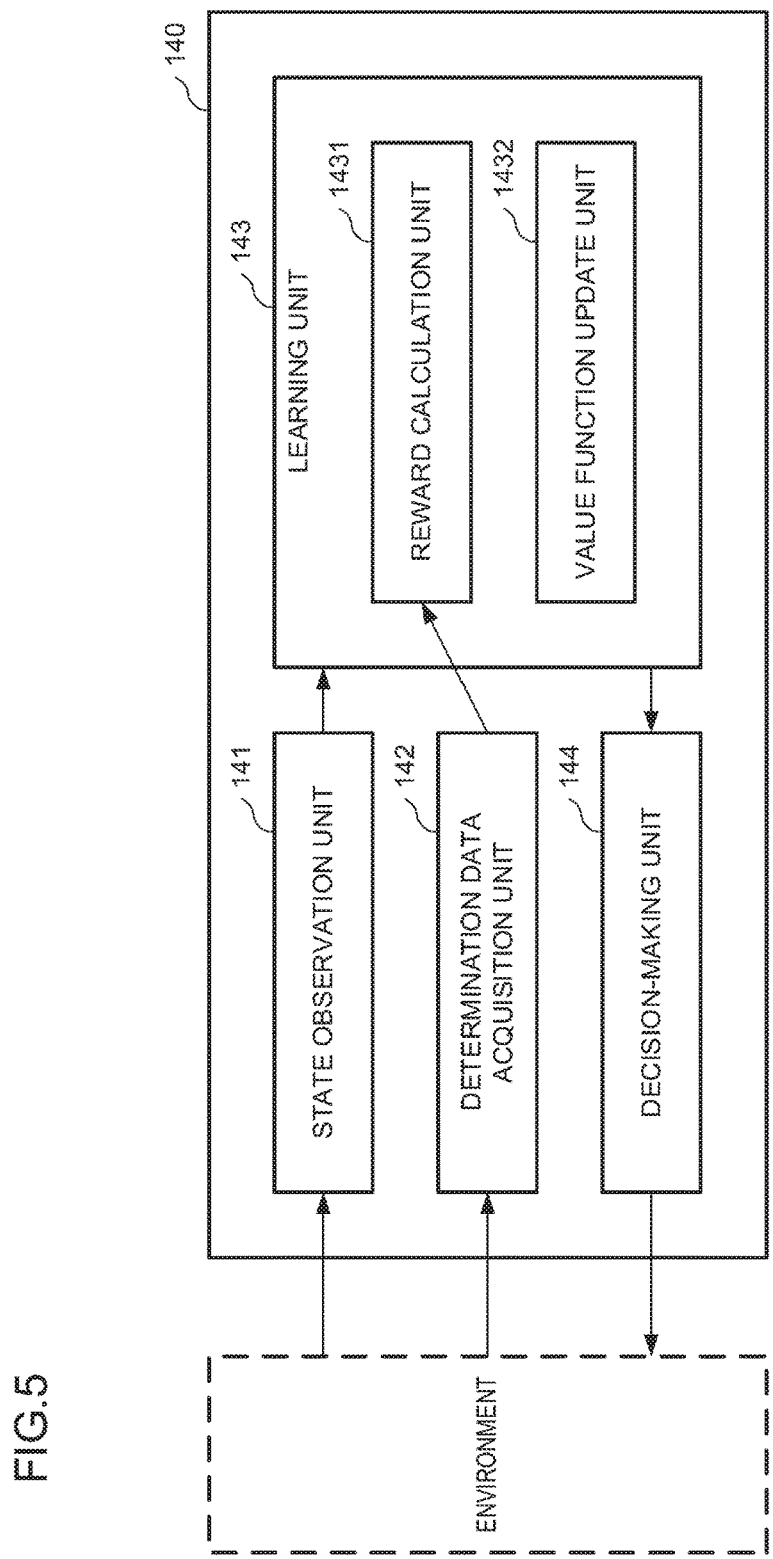
FIG. 5 is a diagram for describing an overview of a machine learning unit of the numerical controller according to the second embodiment.

FIG. 5 is a view illustrating a concept of machine learning for optimization of the point R in the machine learning unit 140. Incidentally, FIG. 5 only illustrates the configuration necessary for description of machine learning according to the present embodiment.

The machine learning unit 140 includes a state observation unit 141, a determination data acquisition unit 142, a learning unit 143, and a decision-making unit 144. The learning unit 143 includes a reward calculation unit 1431 and a value function update unit 1432.

The state observation unit 141 acquires the state data as information to specify the environment (the state $s_t$ described in <1. Machine Learning>). In the present embodiment, the spindle feedrate, the spindle rotational speed, and the workpiece top position are used as the state data. The spindle feedrate and the spindle rotational speed are data that the numerical controller 100 can acquire from the machining device. The workpiece top position can be obtained by the workpiece top detection unit 130. Incidentally, a worker may appropriately decide any data to be used as the state data.

Figure 6:
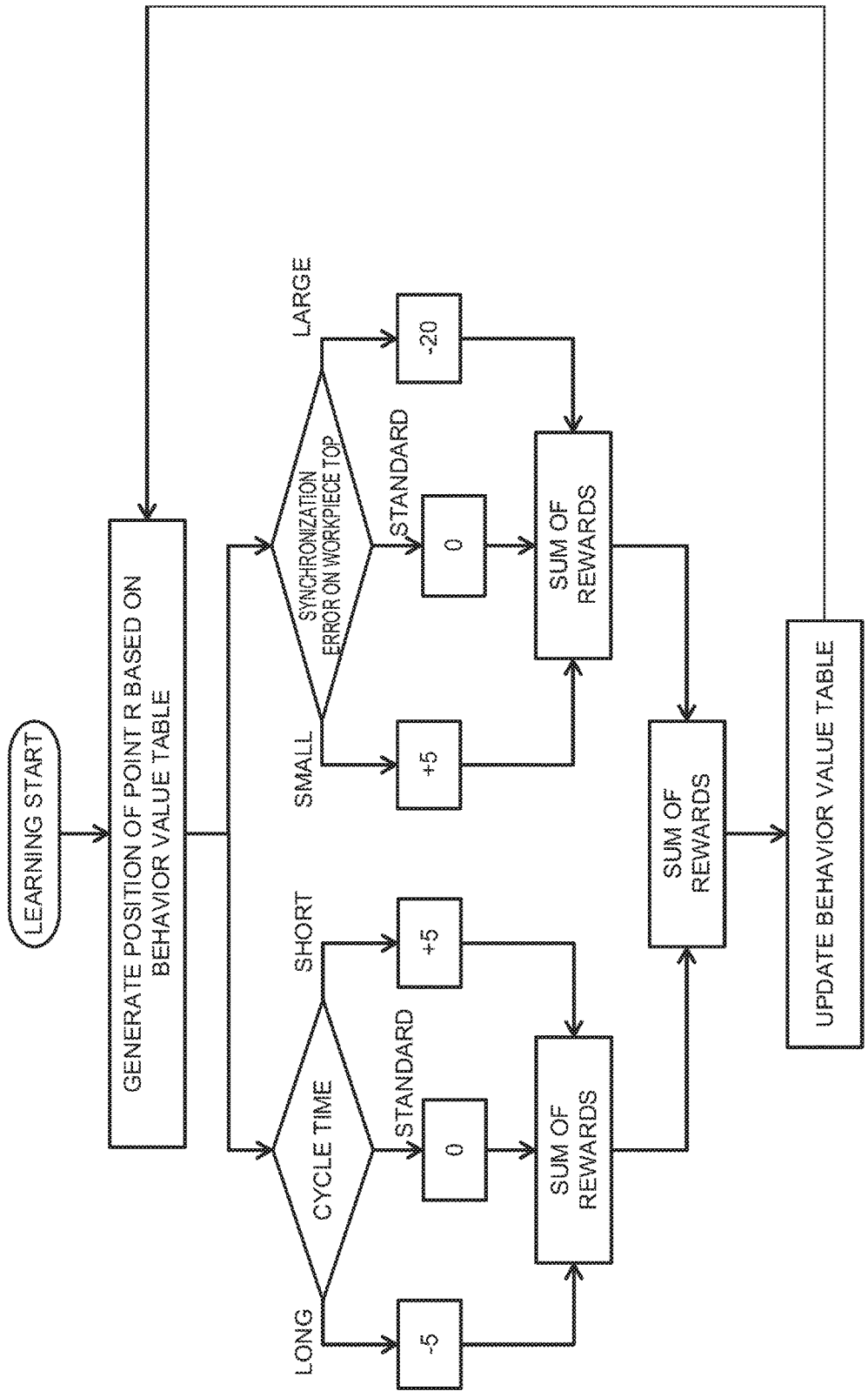
FIG. 6 is a view for describing an operation of the machine learning unit of the numerical controller according to the second embodiment.

In addition, the information (the behavior $a_t$ described in <1. Machine Learning>) that the machine learning unit 140 outputs to the environment in the present embodiment is the position of the point R. In addition, long or short cycle time (plus or minus reward) and a synchronization error (plus or minus reward) on the workpiece top are adopted as the reward (reward $r_t$ described in <1. Machine Learning>) granted to the machine learning unit 140 in the present embodiment as illustrated in FIG. 6. In regard to the cycle time, for example, the cycle time of a case where machining is performed at the point R according to a program command is taken as a reference value, and rewards of 0, −5, and +5 are granted, respectively, when the cycle time is equivalent to, is longer than, and is shorter than the reference value. In regard to the synchronization error on the workpiece top, rewards of 0, −20, and +5− are granted, respectively, when the synchronization error is equivalent to, is larger than, and is smaller than a predetermined reference value. Incidentally, the worker may appropriately set any reward to be granted based on what kind of data.

In the present embodiment, the machine learning unit 140 performs machine learning based on the input data, the output data, and the reward described above. In the machine learning, the state $s_t$ is defined by the combination of the input data, the setting of the point R on the premise of the defined state $s_t$ is the behavior $a_t$, and then, a value obtained by evaluation calculation for a result of the rigid tap performed by the behavior $a_t$ is the reward $r_{t+1}$, and the learning is advanced by applying these values to the update formula of the value function (evaluation function) according to the machine learning algorithm as described in <1. Machine Learning>.

The decision-making unit 144 decides and outputs an optimum position of the point R based on the result learned by the learning unit 143 and the data related to the current state. The decision of the position of the point R referred to herein corresponds to the behavior a that is used for machine learning. The position of the point R is prepared as, for example, a behavior that allows selection of the position of the point R (for example, Behavior 1=Workpiece Top+0.1 mm, Behavior 2=Workpiece Top+0.2 mm, . . . ), and a behavior that maximizes the reward to be obtained in the future based on the past learning result may be selected. In addition, the above-described ε greedy method may be adopted so that the learning of the learning unit 143 may be advanced by selecting a random behavior with a predetermined probability.

Then, the decision-making unit 144 outputs the position of the point R decided by the selection of the behavior to the synchronization error monitoring unit 120. Thereafter, the calculation of an evaluation value using the reward calculation unit 1431 and the acquisition of the state data using the state observation unit 141 are performed, and it is possible to obtain a more excellent learning result by repeating the machine learning.

If the above-described learning is completed, the machine learning unit 140 may be set so as not to perform new learning but operated directly using learning data at the time of learning completion. In addition, the machine learning unit 140 that has completed learning (or the machine learning unit 140 that has duplicated the learning data completed by another machine learning unit 140) may be attached to another numerical controller 100 to be operated directly using learning data at the time of learning completion.

Although the machine learning unit 140 of the numerical controller 100 may independently perform machine learning, it is possible to share the learning result stored by the respective machine learning units 140 through transmission and reception when the plurality of the numerical controllers 100 further include units for communication with the outside, respectively, and it is possible to more efficiently perform the machine learning. For example, it is possible to efficiently perform learning by configuring such that learning is advanced in parallel through exchange of state data and learning data among the respective numerical controllers 100 while changing different positions of the point R in the plurality of numerical controllers 100 within a predetermined range.

At the time of exchange among the plurality of numerical controllers 100 in this manner, communication may be performed via a host computer which is a host device, or the numerical controllers 100 may communicate directly with each other or communicate using a cloud. Since there is a case where a large amount of data is handled, it is preferable to use a communication unit having high communication speed as much as possible.

Third Embodiment

A numerical controller 100 according to a third embodiment is characterized in that a position of a point R is optimized after a tool is removed from a workpiece.

The method of setting the point R at the time before machining is performed on the workpiece, that is, the time before the tool inserted into the workpiece has been described in the first embodiment and the second embodiment. In the third embodiment, a method of setting the point R after the tool is removed from the workpiece will be described.

Figure 1:
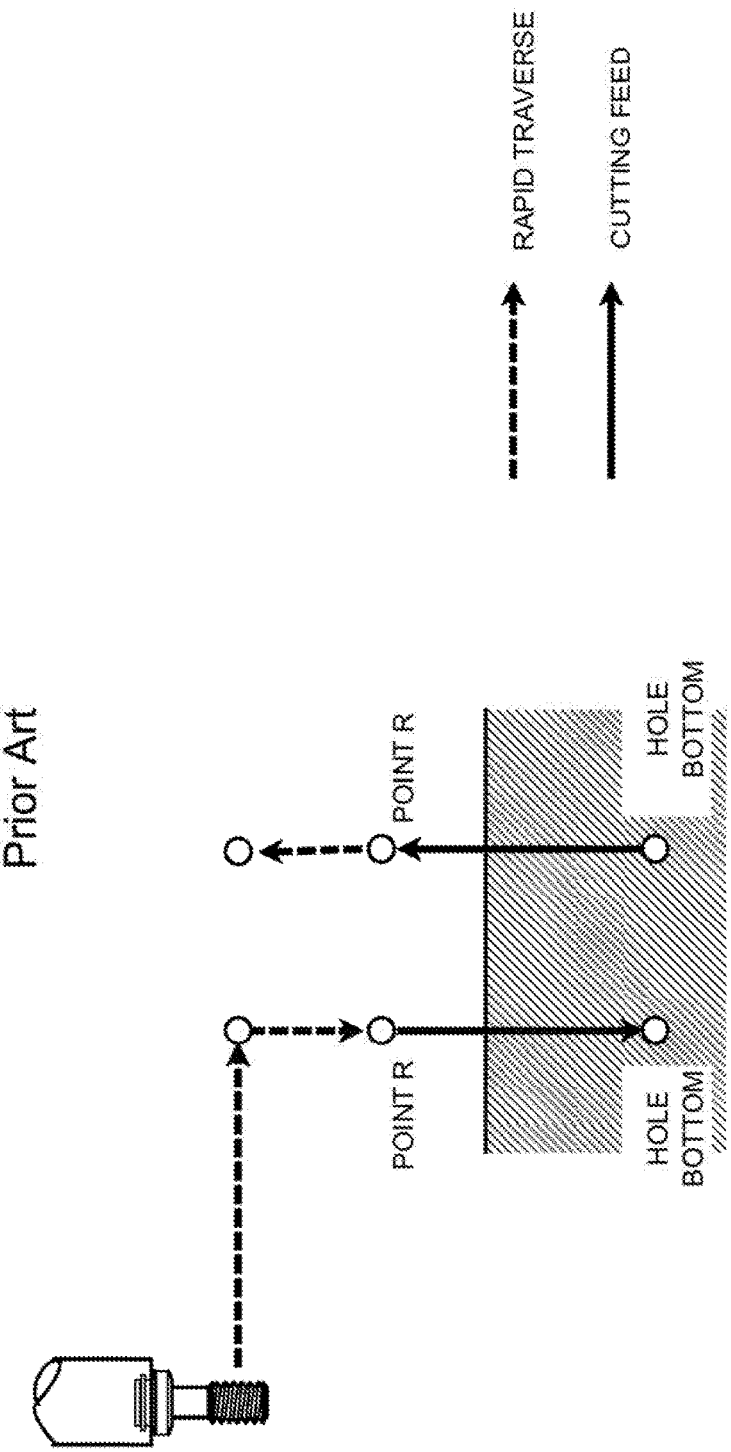
FIG. 1 is a view for describing a rigid tap of the related art.

Conventionally, a point R at the time before the tool is inserted into the workpiece and a point R at the time after the tool is removed from the workpiece are set at the same position as illustrated in FIG. 1. Meanwhile the point R is a point to turn ON/OFF a synchronous state between rotational speed of A spindle and feedrate. That is, the point R after the tool is removed from the workpiece is a point at which the synchronized state maintained until then is canceled. In general, if the tool is removed from the workpiece, there is no reason to maintain the synchronized state even after then. Accordingly, the position of the optimum point R after the tool is removed from the workpiece is the workpiece top.

A configuration of the numerical controller 100 according to the third embodiment is the same as that of the first embodiment. That is, the numerical controller 100 includes a rigid tap control unit 110, a synchronization error monitoring unit 120, and a workpiece top detection unit 130.

The rigid tap control unit 110 controls a spindle to execute a rigid tap. The synchronization error monitoring unit 120 monitors a synchronization error at the time of performing machining ahead of the workpiece top (assuming the first embodiment) or the point R (assuming the second embodiment or the related art), and outputs an error when an error amount exceeds a predetermined threshold value. In addition, the synchronization error monitoring unit 120 terminates monitoring of the synchronization error when the tool is removed from the workpiece top. Prior to the execution of the rigid tap using the rigid tap control unit 110, the workpiece top detection unit 130 detects the position of the workpiece top and stores the detected position.

An operation of the synchronization error monitoring unit 120 will be further described. The synchronization error monitoring unit 120 constantly monitors a distal end position of the tool during execution of the rigid tap and compares the position with the workpiece top position stored by the workpiece top detection unit 130. When the tool distal end once reaches a hole bottom passing through the workpiece top and reversed to reach the workpiece top again, the synchronization error monitoring unit 120 terminates the process of monitoring the synchronization error.

According to the present embodiment, the numerical controller 100 terminates the synchronization error monitoring at the time when the tool is removed from the workpiece top. In other words, the point R after the tool is removed is set to the workpiece top. Accordingly, it is possible to omit the synchronous error monitoring process, which has been conventionally performed until reaching the point R from the workpiece top after termination of the rigid tap, and to improve the cycle time.

Incidentally, the present invention is not limited to the above-described embodiments and can be appropriately changed within a scope not departing from a spirit of the invention. The present invention can modify arbitrary constituent elements of the embodiments or omit arbitrary constituent elements of the embodiments within the scope of the invention.

For example, the top detection unit 130 detects the workpiece top based on the spindle load in the machining of the pilot hole in the above-described embodiments. However, the present invention is not limited thereto, and the position of the workpiece top may be detected using another arbitrary method, for example, a distance sensor or the like.

The invention claimed is:

1. A numerical controller that executes a rigid tap by starting synchronization between the rotational speed of a spindle and the feed rate of a rigid tap without stopping the spindle at a point R of which the height is set higher than a top of a workpiece, comprising:
   a workpiece top detection unit that detects a position of the workpiece top; and
   a synchronization error monitoring unit that starts monitoring for determining whether or not an error amount of a synchronization error in the synchronization exceeds a predetermined threshold value at the position of the workpiece top.

2. A numerical controller that executes a rigid tap, the numerical controller comprising:
   a processor configured to:
      detect a position of a workpiece top; and
      determine, by machine learning, a point R which is a height higher than the workpiece top to start a synchronization between a rotational speed of a spindle and a feed rate of the rigid tap, the point R is determined to optimize at least one of a cycle time of the rigid tap and the or a synchronization error of the synchronization between the rotational speed of the spindle and the feed rate of the rigid tape.

* * * * *